United States Patent Office 2,762,816
Patented Sept. 11, 1956

2,762,816

TRIAZOLE PHTHALAMIC ACIDS

Clarence W. Huffman, El Dorado, Ark., assignor, by mesne assignments, to Monsanto Chemical Company, St. Louis, Mo., a corporation of Delaware No Drawing. Application January 31, 1955,
Serial No. 485,333

6 Claims. (Cl. 260—308)

The present invention is concerned generally with a new class of triazole derivatives, and more particularly with 1,2,4-triazole phthalamic acids and a method for their preparation.

My new compounds may be described by the following general structural formula.

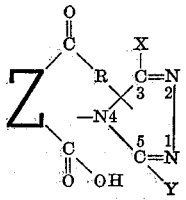

wherein R is NH, and the free valence bond of the 4 position nuclear nitrogen of the triazole residue is satisfied by R or a hydrogen atom, X is R, alkyl or a hydrogen atom, Y is alkyl or a hydrogen atom, and Z represents the phenylene radical when X and Y are alkyl groups and R is attached to the 4 position nitrogen of the triazole residue; while Z represents the endoxohexahydrophenylene radical when X is R and hydrogen atoms satisfy the valence bonds of the 4 and 5 position nitrogen-carbon atoms respectively of the triazole ring.

It is the object of the present invention to provide a new class of 1,2,4-triazole derivatives, and a method for preparing same.

The more specific object is to prepare novel 1,2,4-triazole phthalamic acids.

The compounds of the present invention are prepared by allowing a 3 or 4 position monoamino substituted triazole to react with phthalic anhydride or endoxohexahydrophthalic anhydride, depending upon which derivative is being prepared. When the 4-amino triazole is undergoing reaction, either or both of the 3 and 5 position nuclear carbons are substituted by alkyl groups which may be the same or different. The reactants are combined preferably in equimolecular quantities, and heated until the reaction is completed. A solvent or diluent is not required in carrying out the reaction.

It should be pointed out that imides result from the reaction of an unsubstituted 3-amino triazole with phthalic anhydride. A similar result occurs when unsubstituted 4-amino triazole is allowed to react with the endoxoanhydride. Surprisingly therefore, I am to obtain phthalamic acids by allowing a substituted 4 aminotriazole to react with phthalic anhydride or by allowing an unsubstituted 3 amino triazole to react with the endoxoanhydride. Furthermore, I have been unable to prepare the imides from the phthalamic acids in the manner expected by accepted procedures. I am unable to explain this apparent anomaly.

The phthalimide derivatives of 1,2,4-triazole form the subject of a separate application Ser. No. 485,334 filed on even date herewith.

My new triazole phthalamic acids are useful for a variety of purposes. Of particular importance is their use as plant growth regulators. They also find application in polymer formation, as additives to lube oils, and as plastic modifiers.

The examples which follow, describe in more detail the manner in which my new compounds are prepared. Variations and modifications within the purview of those skilled in the art will be apparent.

EXAMPLE I

*Preparation of N-[4-(3,5-dimethyl-1,2,4-triazolyl)]-ortho-phthalamic acid*

Phthalic anhydride (14.8 g., 0.1 mole) and 4-amino-3,5-dimethyl-1,2,4-triazole (11.2 g., 0.1 mole) were mixed and heated. A water-white melt formed in seven minutes at 150° C. Heating was continued for seven hours at 100° C.–200° C. The resulting dark liquid was soluble in water and dilute sodium carbonate.

The reaction mixture was heated with benzene (50 ml.) after which the benzene was decanted. The solid was dissolved in hot acetonitrile (25 ml.) and treated with charcoal. Ninety ml. of isopropyl ether was added to the brown filtrate. The mixture was cooled in the icebox overnight, and the product removed by filtration and dried. A yield of 21 g. (87% of first crop crude material) was obtained, M. P. 179° C.–195° C.

One gram of crude material was heated with water (100 ml.) and filtered hot. The insoluble portion weighed 0.7 g. after drying at 80° C. This material was heated with 30 ml. of acetonitrile and filtered hot. The filter cake weighed 0.5 g. Solution in dimethyl formamide-acetonitrile, followed by the addition of isopropyl ether, cooling and filtration gave 0.4 g. of the phthalamic acid, M. P. 197° C., with sintering at 193° C.

| Analysis | Percent C | Percent H | Percent N |
|---|---|---|---|
| Calculated for $C_{12}H_{12}N_4O_3$ | 55.4 | 4.65 | 21.1 |
| Found | 55.5 | 4.70 | 21.1 |

An attempt was made to prepare the product using acetic acid as a solvent for the reaction mixture. A number of different unidentified fractions resulted.

An attempt was also made to prepare the phthalimide from the acid, however, the application of heat to the reaction mixture containing the acid for a prolonged period failed to convert the material to the imide as might be expected.

EXAMPLE II

*Preparation of N-[3-(1,2,4-triazolyl)]-3',6'-endoxohexahydro-ortho-phthalamic acid*

3-amino-1,2,4-triazole (11.2 g., 0.1 mole) was boiled gently with acetonitrile (450 ml.) to remove any water. An addition of 3,6-endoxohexahydrophthalic anhydride (16.8 g., 0.1 mole) was made and a condenser (closed by a drying tube) installed. Most of the anhydride dissolved in two minutes, after which crystallization occurred. Refluxing was continued for 5½ hours. The crystals were removed by filtration and washed with acetonitrile. Drying at 95° C. in vacuum gave 15.7 g. (56% yield) of first crop crude product, M. P. 334° C.–335° C., with sintering at 275°. This material was insoluble in all solvents tested. Solution of a small sample of this material in dilute sodium hydroxide, charcoaling and precipitation with dilute hydrochloric acid gave white crystals. M. P. 330.8° C.–332° C., with sintering at 300° C. This purified sample analyzed as follows:

| Analysis | Percent C | Percent H | Percent N |
|---|---|---|---|
| Calculated for $C_{10}H_{12}N_4O_4$ | 47.6 | 4.80 | 22.2 |
| Found | 47.1 | 4.29 | 21.3 |

Cooling the acetonitrile filtrate in the icebox yielded a further 5.0 grams (18%) of crude product, making a total yield of 74% with a M. P. of 266° C.-290° C.

I claim:

1. As new chemical compounds, 1,2,4-triazolyl phthalamic acids having a formula selected from the group consisting of

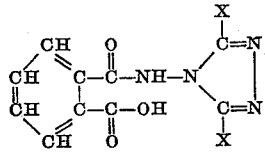

and

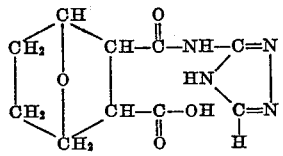

wherein X is a low molecular weight alkyl group.

2. N[4-(3,5-dimethyl-1,2,4-triazolyl)]-ortho-phthalamic acid.

3. N[3 - (1,2,4 - triazolyl)] - 3',6' - endoxohexahydro-orthophthalamic acid.

4. A process for preparing a new class of 1,2,4-triazolyl phthalamic acids having a formula selected from the group consisting of

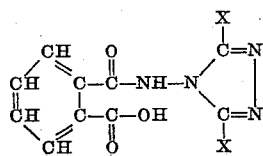

and

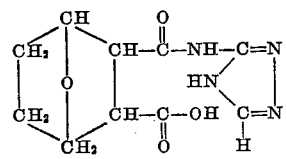

wherein X is a low molecular weight alkyl group which comprises allowing a compound having a formula selected from the group consisting of

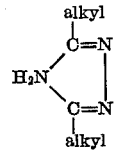

and

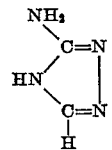

to react with a compound selected from the group consisting of phthalic anhydride and 3,6-endoxohexahydrophthalic anhydride.

5. A process for preparing N-[3-(1,2,4-triazolyl)]-3',6'-endoxohexahydro-ortho-phthalamic acid which comprises reacting 3-amino-1,2,4-triazole with 3,6-endoxohexahydrophthalic anhydride.

6. A process for preparing N-[4-(3,5-dimethyl-1,2,4-triazolyl)]-ortho-phthalamic acid which comprises reacting phthalic anhydride with 4-amino-3,5-dimethyl-1,2,4-triazole.

No references cited.